United States Patent [19]

Ettel et al.

[11] 4,394,366
[45] Jul. 19, 1983

[54] PROCESS FOR PRODUCTION OF COCL$_2$ SOLUTION FROM COBALTIC OXIDE-HYDRATE

[75] Inventors: Victor A. Ettel, Mississauga; Eric A. Devuyst, Toronto; Alexander Illis, Mississauga, all of Canada

[73] Assignee: Inco Limited, Toronto, Canada

[21] Appl. No.: 260,059

[22] Filed: May 4, 1981

[30] Foreign Application Priority Data

Nov. 14, 1980 [CA] Canada .................................. 364745

[51] Int. Cl.$^3$ ............................................. C01G 53/08
[52] U.S. Cl. .................................. 423/493; 423/150; 204/112
[58] Field of Search ............... 423/138, 140, 147, 150, 423/493; 204/112

[56] References Cited

U.S. PATENT DOCUMENTS

| | | | |
|---|---|---|---|
| 2,415,665 | 2/1947 | Wallis et al. .......................... | 423/60 |
| 4,151,258 | 4/1979 | Crnojevich et al. ................ | 423/150 |
| 4,274,930 | 6/1981 | Ettel et al. ....................... | 423/138 X |

OTHER PUBLICATIONS

Syper, "Oxidation of Some Organic Compounds by Cobalt (III) Hydroxide", Roczniki Chemii, vol. 47, pp. 43–48, 1973.

Mellor, "A Comprehensive Treatise on Inorganic and Theoretical Chemistry", Longmans, Green & Co., New York, vol. 14, 1935, p. 653.

*Primary Examiner*—Earl C. Thomas
*Attorney, Agent, or Firm*—Raymond J. Kenny; Ewan C. MacQueen

[57] ABSTRACT

This invention is concerned with a process for dissolving oxidic trivalent cobalt compounds in hydrochloric acid while avoiding the generation of chlorine. It includes the following steps (a) slurrying in water the trivalent cobalt compound to be dissolved and (b) treating the resulting slurry with a reduction agent from the group consisting of methanol, formaldehyde and formic acid and with hydrochloric acid. The contact of the hydrochloric acid with the slurry should occur in the presence of the reducing agent. The rate of acid addition should be controlled to maintain the slurry at a pH above 1.

5 Claims, No Drawings

PROCESS FOR PRODUCTION OF COCL$_2$ SOLUTION FROM COBALTIC OXIDE-HYDRATE

BACKGROUND OF THE INVENTION

Cobaltic hydroxide by product precipitates occur in the purification circuits of nickel electrolytes in nickel electrorefining or electrowinning plants and in the purification circuits of nickel leaching solutions. These precipitates tend to be fine black hydrous materials from which the valuable cobalt should be recovered. In many instances it is desirable to recover the cobalt as cobaltous chloride. Since cobaltic hydroxide is a strong oxidizing agent, it is found that a simple solution of the cobaltic hydroxide in hydrochloric acid is not commercially desirable due to the strong evolution of chlorine from the hydrochloric acid. It is known from the work of Syper which appears in *Roczniki* Chemii, Volume 47, page 43, etc. 1973 that various organic compounds including alcohol act as reductants in the presence of cobaltic hydroxide to convert the cobaltic hydroxide to the cobaltous form. Use of alcohols, aldehydes, and organic acids to reduce cobaltic hydroxide is also disclosed in the U.S. Pat. No. 4,151,258. Neither of these references treats of the manufacture of cobaltous chloride from cobaltic hydroxide.

SUMMARY OF THE INVENTION

The invention is based on the discovery that cobaltic hydroxide can be dissolved as cobaltous chloride by treating the slurry of the cobaltic hydroxide with a reductant such as methanol, formaldehyde or formic acid and with hydrochloric acid under conditions such that contact of the acid with the cobaltic hydroxide slurry occurs in the presence of the organic reductant and such that the rate of hydrochloric acid addition to the slurry is controlled to maintain the slurry pH above 1. Under these conditions no evolution of chlorine from the hydrochloric acid occurs.

DETAILED DESCRIPTION OF THE INVENTION

In accordance with the invention, cobaltic hydroxide is dissolved to yield cobaltous chloride by contacting a water slurry of cobaltic hydroxide with a sufficient amount of an organic reductant from the group consisting of methanol, formaldehyde, and formic acid to reduce the cobaltic hydroxide and with hydrochloric acid added in the presence of the reductant at a rate such that the solution pH does not decrease below pH 1. Thus, the reaction is carried out with the water slurry of cobaltic oxide hydrate with the addition of the organic reductant prior to or in combination with the hydrochloric acid. Preferably, when the organic reductant is added first to the slurry containing cobaltic hydroxide, a closed vessel fitted with a reflux condenser is used to prevent excessive losses of the volatile organic reductant. The reduction reaction from cobaltic to cobaltous ions is temperature dependent and accordingly the initial slurry temperature should be at least about 75° C. to obtain adequate reaction kinetics. The dissolution reaction is exothermic with the result that the slurry temperature tends to rise into the region of 90° to 95° C. dependent upon the addition rate of acid to the reaction mixture.

The oxidation of methanol appears to occur in stepwise fashion through formaldehyde to formic acid and followed ultimately by the conversion of the initial methanol to $CO_2$ and water. It is found, however, that even when a large excess of methanol is present the concentration of formic acid and formate during the reduction will be almost below the detection limit for these compounds. Upon completion of the reaction involved any excess methanol can readily be recovered and cobalt can be recovered as cobaltous chloride hexahydrate simply by evaporation of excess water.

The process of the invention can be used in a cobalt leach-electrowinning loop for the production of electrolytic cobalt using spent cobalt electrowinning electrolyte, hydrochloric acid and methanol to leach cobaltic hydroxide. In such as process, the chlorine evolved in the electrowinning can be used to prepare cobaltic hydroxide from impure cobalt-containing process liquor.

Materials which may be treated in accordance with the invention may contain, on a dry basis, about 50% to about 58% cobalt, up to about 2% nickel, up to about 2% iron, up to about 2% copper, up to about 5% sulfur. Some examples will now be given.

EXAMPLES

EXAMPLE I

A water slurry was prepared by mixing 50 grams of cobaltic hydroxide in 100 milliliters of water. The cobaltic hydroxide contained, by weight, 57.6% cobalt, 0.01% copper, 0.43% nickel, 0.11% iron, 1.4% sulfur, 0.18% chlorine ion, 3.61% sulfate ion, 3.08% water. When this slurry was treated with the hydrochloric acid solution containing hydrochloric acid in the ratio of two moles HCl to each mole of cobalt, in an addition time of one minute, it was found that after three hours of reaction a final pH less than 1 resulted with a cobalt extraction of 56% and a cobalt concentration in solution of 79.3 grams per liter. Strong evolution of chlorine gas resulted.

A series of similarly prepared cobaltic hydroxide slurries was then treated seriatim with mixtures of hydrochloric acid and methyl alcohol in which the molar ratio of methanol to hydrochloric acid was varied from 0.165 to 1.2. The rate of addition of the HCl-methanol mixture was controlled to hold the pH in the reacting slurry above 1. The initial slurry temperature was 75° C. and during reaction the temperature increased to 90° C. 0.2 milliliters of methanol was added to the slurry just before the first addition of acid-methanol mixture. The slurry was vigorously stirred to contact the reactants. The results of four experiments carried out under the four described conditions are set forth in the following Table 1. The results in the table establish that the presence of methanol not only prevents chlorine evolution but also promotes the extraction of cobalt in solution. A large excess of methanol, however, was required to achieve complete cobalt extraction. This was attributed to the fact that an open reaction vessel was used for the test.

TABLE 1

| Test | HCl (mole/mole Co) | MeOH (mole/mole Co) | Reagents Addition Time (min) | Reaction Time (min) | Final pH | Solution Co (g/l) | Co Extraction (%) |
|---|---|---|---|---|---|---|---|
| 1 | 2 | 0.33 | 62 | 120 | 0.95 | 118 | 83 |
| 2 | 2 | 0.66 | 16 | 35 | 1.5 | 130 | 92 |
| 3 | 2 | 1.00 | 12 | 20 | 1.5 | 132 | 94 |
| 4 | 2 | 2.40 | 5 | 180 | 2.0 | 142 | 100 |

EXAMPLE 2

A slurry was prepared containing 400 grams of cobalt hydroxide cake assaying 50% by weight cobalt in 0.5 liters of water in an open beaker. The slurry was reacted at 60° C. with a formaldehyde-hydrochloric acid mixture added continuously at a rate corresponding to 40 milliliters of 37% formaldehyde solution and 80 milliliters of 12 normal hydrochloric acid per hour. A virtually clear leach solution was obtained after seven hours of reaction and the extraction of cobalt was 98%. The pH of the leach solution was 1.75 with a cobalt concentration in solution 170 grams per liter as cobaltous chloride. The consumptions of HCl and formaldehyde were, respectively, two moles of HCl and one mole of formaldehyde per mole of the cobalt leached.

EXAMPLE 3

Another 400 gram sample of cobalt hydroxide cake which had been dried at 150° C. for 16 hours and had a particle size of less than −200 mesh, assaying 50% by weight cobalt was slurried with 0.5 liters of water in a glass reaction vessel open to the atmosphere through a reflux condenser. 40 milliliters of a 95% by weight methanol solution were added to the slurry representing 200% stoichiometric excess of methyl alcohol with respect to reduction of the feed trivalent cobalt to divalent cobalt. The slurry was heated to 80° C. and 12 normal hydrochloric acid solution was added on pH demand at pH setting of 2. After nine hours of reaction the extraction of cobalt in solution was 81% complete at a concentration in solution of 162 grams per liter.

EXAMPLE 4

200 grams of cobalt hydroxide cake assaying 50% by weight cobalt were slurried with 0.5 liters of water in a glass reactor open to the atmosphere through a reflux condenser. 40 milliliters of a 95% by weight methanol solution were added to the slurry representing 400% stoichiometric excess of methanol for reduction of the feed trivalent cobalt to divalent cobalt. The slurry was heated to 90° C. and a 12 normal HCl solution was added on pH demand at a pH setting of 1.5. After four hours of reaction at 90° C. the extraction of cobalt in solution was 96% at a concentration in solution of 130 grams of cobalt per liter.

EXAMPLE 5

The experiment described in Example 3 was repeated and continued by adding to the reaction mixture 10 milliliters of a 98% by weight formic acid solution and the reaction was then continued for 6 hours at 80° C. with addition of 12 normal HCl on pH demand at a pH setting of 2. at this point the extraction of cobalt in solution was 95% at a concentration of 172 grams of cobalt per liter.

EXAMPLE 6

The experiment described in Example 4 was repeated and continued by adding to the reaction mixture 10 milliliters of 98% by weight formic acid solution and the reaction continued for two hours at 90° C. with a 12 normal HCl solution being added upon pH demand at a pH setting of 1.5. The extraction of cobalt in solution was 98.5% complete at a concentration of 133 grams per liter of cobalt.

EXAMPLE 7

Cobalt chloride leach solutions obtained in Examples 3 and 6 were evaporated at 105° C. until the cobalt concentration in solution was approximately 400 grams per liter. The concentrated solutions were then slowly cooled while being stirred at 1,000 rpm. Crystallization of 60 to 70% of the cobalt as cobaltous chloride hexahydrate onto the walls of the container occurred. The solids were recovered after filtering and drying in air. Analyses of the feed cobaltic hydroxide and of the cobaltous chloride hexahydrate resulting are shown in the following Table 2.

TABLE 2

| | Methanol Leach Example 4 | | Methanol and Formic Acid Leach Example 6 | |
|---|---|---|---|---|
| Element | Feed* $Co(OH)_3$ (wt. %) | $CoCl_2\ 6H_2O$ (wt. %) | Feed* $Co(OH)_3$ (wt. %) | $CoCl_2\ 6H_2O$ (wt. %) |
| Co | 25.3 | 25.3 | 27.1 | 27.1 |
| Ni | 0.42 | 0.29 | 0.17 | 0.11 |
| Cu | 0.003 | 0.0004 | 0.006 | 0.0012 |
| Pb | 0.004 | 0.001 | 0.0003 | 0.001 |
| Fe | 0.060 | 0.001 | 0.035 | 0.009 |
| Ca | — | 0.004 | — | 0.001 |
| Mg | — | 0.0004 | — | 0.0002 |
| Na | 0.60 | 0.049 | 0.014 | 0.002 |
| Mn | 0.011 | 0.003 | 0.007 | 0.003 |
| S | — | 0.56 | — | 0.069 |
| C | — | 0.12 | — | — |

NOTE:
Composition of $Co(OH)_3$ feed cakes are referred to the same Co as the $CoCl_2.6H_2O$ product for sake of comparison. Wet $Co(OH)_3$ cake usually assays 25% Co; dried $Co(OH)_3$ assays 50% Co.

While the process has been described hereinbefore through the use of methanol, formaldehyde and formic acid as the organic reductant the equivalence of ethanol and its oxidation products has been recognized in the art. In fact the equivalence of alcohols containing up to four carbon atoms and their oxidation products has already been recognized in the art, to that of methanol as a reductant for cobaltic ion. However, methanol, formaldehyde and formic acid are the preferred ingredients for purposes of reducing cobaltic ion, with the overall dissolution reactions believed to be as follows, respectively:

1. $6\ Co(OH)_3 + 12HCl + CH_3OH\ \longrightarrow\ 6\ CoCl_2 + Co_2 + 17\ H_2O$

2. $4 Co(OH)_3 + 8HCl + CH_2O \rightarrow 4 CoCl_2 + CO_2 + 11 H_2O$

3. $2 Co(OH)_3 + 4HCl + HCOOH \rightarrow 2 CoCl_2 + CO_2 + 6 H_2O$

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

The embodiments of the invention in which an exclusive property or privilege is claimed are defined as follows:

1. A process for producing cobaltous chloride from cobaltic hydroxide while avoiding the generation of chlorine which comprises slurrying in water cobaltic hydroxide to be dissolved and treating the resulting slurry with a reducing agent from the group consisting of methanol, formaldehyde and formic acid and with hydrochloric acid such that the contact of said acid with said slurry occurs in the presence of said reducing agent and the rate of said acid addition is controlled to maintain the slurry at a pH above 1.

2. A process in accordance with claim 1 wherein a substantial excess of reducing agent is employed as compared to the stoichiometric proportion required to reduce cobalt from the trivalent to the divalent state.

3. A process according to either of claims 1 or 2 wherein the reaction is performed at a temperature of at least 75° C.

4. A process according to either of claims 1 or 2 wherein said reducing agent is added in admixture with hydrochloric acid.

5. A processing according to either of claims 1 or 2 wherein said reducing agent is methanol.

* * * * *